Sept. 15, 1931.  T. A. WETTIG ET AL  1,823,242
CHASING ATTACHMENT FOR LATHES
Filed April 18, 1927    3 Sheets-Sheet 1
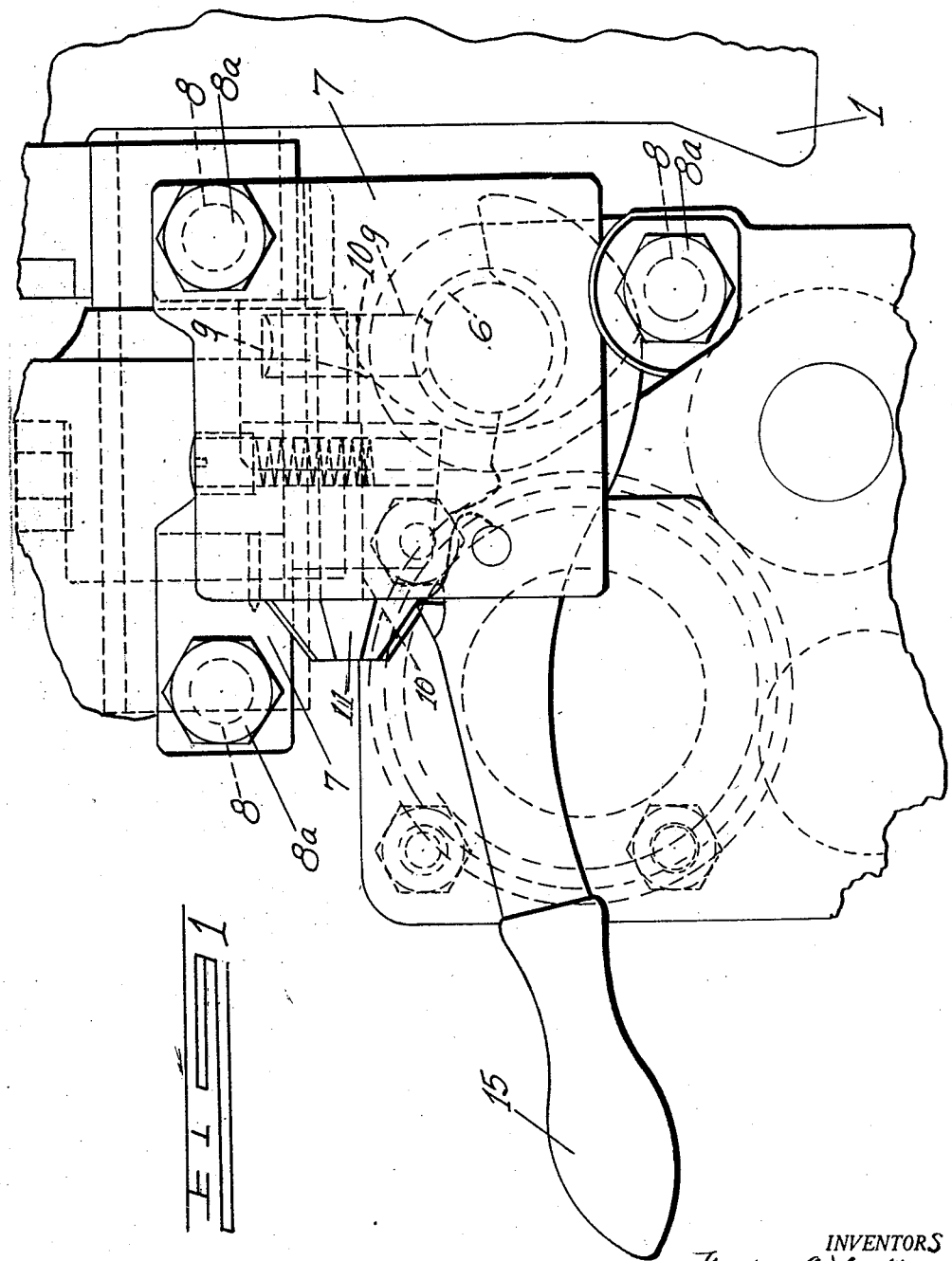
INVENTORS
Theodor A. Wettig
Charles Meier
BY
Allen & Allen
ATTORNEYS

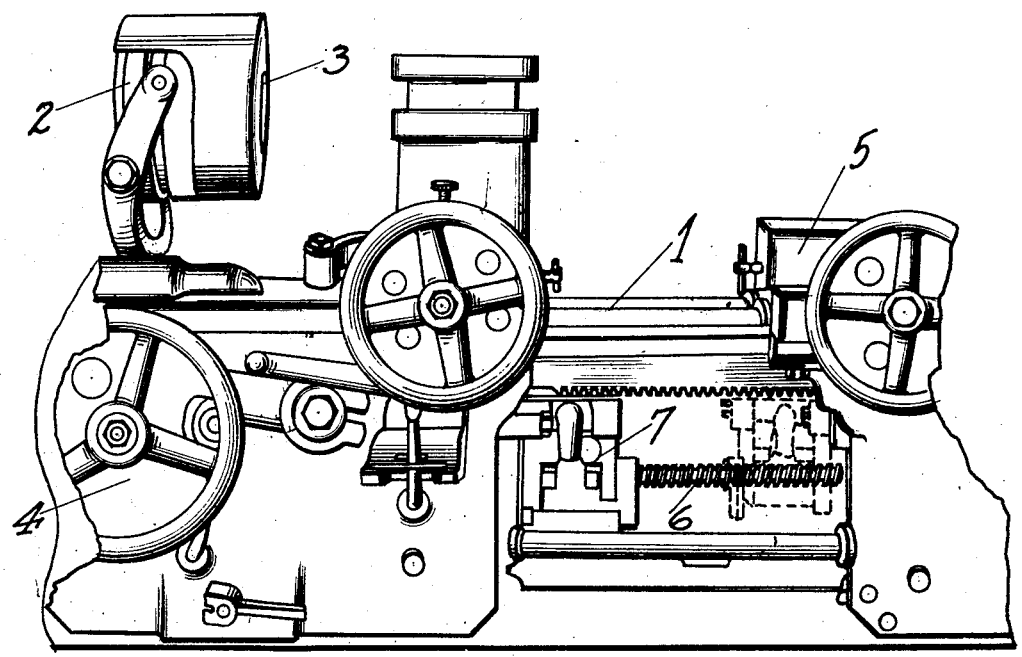
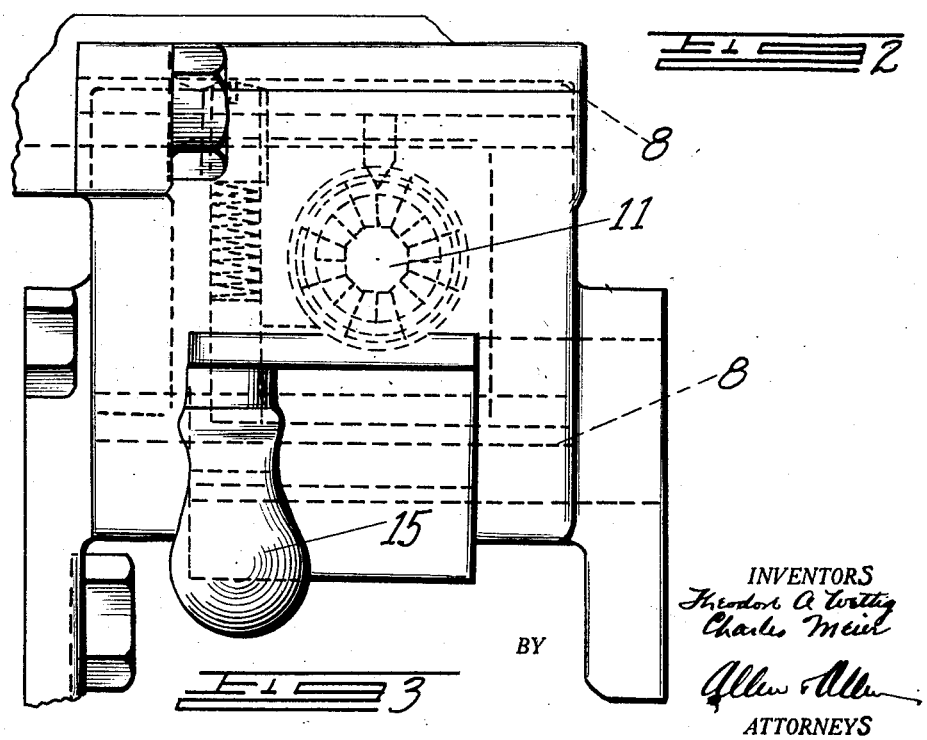

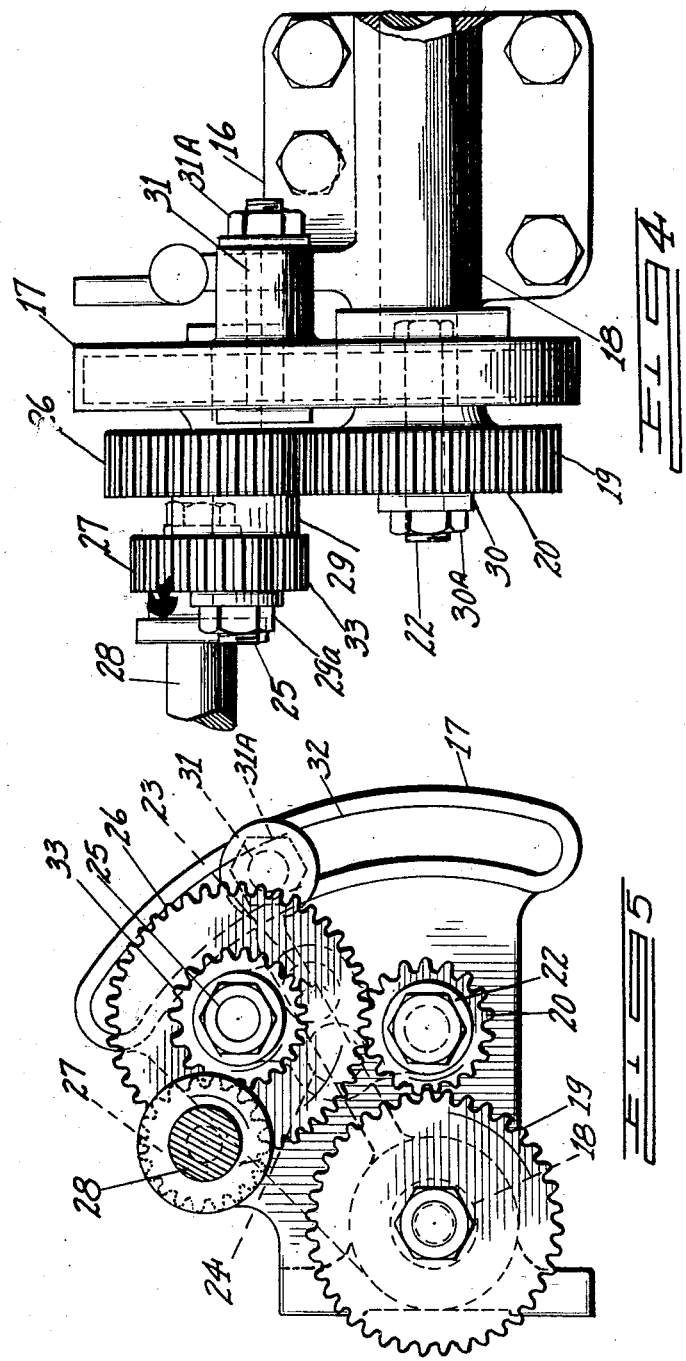

Patented Sept. 15, 1931

1,823,242

UNITED STATES PATENT OFFICE

THEODORE A. WETTIG AND CHARLES MEIER, OF CINCINNATI, OHIO, ASSIGNORS TO THE ACME MACHINE TOOL COMPANY, OF CINCINNATI, OHIO, A CORPORATION OF OHIO

CHASING ATTACHMENT FOR LATHES

Application filed April 18, 1927. Serial No. 184,533.

Our invention relates to improvements in chasing attachments for lathes. The specific invention relates both to improvements in the change gear mechanism support and to improvements in the chasing indicating device.

We provide a lead screw and engaging device which is composed both of a driving and indicating device which may be broadly considered as the chasing attachment, inasmuch as both driving and indicating mechanism form cooperative parts thereof. It is the object of our invention to provide improvements in the housings or supports for these co-operating parts. For the housing which encloses the indicating device, it is our object to provide one which will be interchangeable from the face of one tool carrying unit to an adjacent face of another unit. For the quadrant which supports the change gears which are provided for turning the lead screw which moves the tool carrying unit during the chasing operation, it is our object to provide fixed center positions for the gear shafts which are demountable on the quadrant and through which the driving power is transmitted for moving the tool carrying units.

In machine tools in the past, the provision of chasing attachments has been common. To the best of our knowledge and belief, however, chasing attachments in the past have been effective on the intermediate carriage, or one on the turret carriage, or on each. Attachments have never been made which could be readily inter-changed from operative position with relation to one carriage to operative position with relation to another depending on which carriage was to be used in combination with the rotating work.

The purpose of a chasing attachment is to provide a guide which will enable an operator of a machine to govern the position of a cutting tool with relation to a piece of work in the lathe, so that he may move the cutting tool into engagement with the work at the proper interval. If, for example, a rod or bar is being screw-threaded in the lathe with threads of a certain pitch, and the operator desires to go over the work in order to deepen the cut, it is of course essential that the tool enter the work in exactly the same position a second time as it did the first. Otherwise the threads would be ruined.

As noted, there are various types of chasing attachments all of which are operable on the same principle, so that there is no novelty in the mechanical principle involved in our improvement. The improvements reside more in the structure of the housing and in the arrangement for securing the attachment in operative position than in any basic improvement in the mechanism which we employ within the housing or casing.

Having fixed center positions for the driving gears which operate the lead screw avoids the danger of improper setting which may either cause the change gears to bind or wear. Further, our novel quadrant makes the operation of changing gears much quicker and more simple.

The improvements which we have made are shown in that certain construction and arrangement of parts of which we have illustrated a preferred assembly.

Referring to the drawings:—

Figure 1 is a side elevation of our novel chasing attachment with portions of the tool carrying units of a lathe also shown.

Figure 2 is a perspective view from the side of a lathe on a reduced scale, showing the preferred structure for attaching the device to an intermediate tool carrying unit, with dotted lines showing the position of the attachment when secured to an adjacent unit.

Figure 3 is a front elevation of the chasing attachment.

Figure 4 is a side elevation of the quadrant of our preferred structure.

Figure 5 is an end view of the quadrant showing one set of gears mounted thereon.

Generally indicated at 1 in Figure 2 we have shown the lathe frame which has a head 2 in which the chuck 3 is mounted, an intermediate carriage 4 and a turret head 5. A piece of work to be threaded is mounted in the lathe chuck and the tool is carried in either the intermediate carriage tool holder or in the turret carriage. Modifications in lathes have various arrangements of carriages, and the turret heads may have auxiliary mechanism for performing more than one operation at the same time on a piece of work.

The principle of operation of a lathe, as is well known, is as follows: The work is mounted in the lathe chuck and rotated. A tool which may be mounted in many various manners in either the intermediate carriage or the turret or both, is advanced with relation to the rotating work by engagement with a lead screw indicated at 6 which is rotated by gears from the chuck. Change gears are provided which enable the rate of operation of the lead screw to be varied. The principle of operation of the chasing attachment is that it indicates the various relationships between the rate of speed of the work and the lead screw, so that an operator may at a certain position as indicated throw his tool cutting structure into operation and be sure that the tool will advance with relation to the work in a similar relative position as during a preceding operation.

The chasing attachment which we have illustrated has a housing generally indicated at 7 with bored out portions 8 through which studs 8a may be extended and therewith attached to one of the tool carrying units as indicated in solid lines in Figure 2 or by reversing the studs 8a and moving the attachment along the lead screw the attachment may be attached to the adjacent face of another unit as shown in dotted lines in Figure 2.

Within the housing we have shown the worm wheel 9 which is mounted on the spindle 10. A dial 11, calibrated to indicate various relative positions of the attachment and consequently the unit on which it is carried, is mounted on the spindle 10. A handle 15 provides a manual adjustment for engaging the lead screw. In the particular structure illustrated we have shown a half nut mounted on a rocker arm for engaging the lead screw. Other mechanism may be used, however, and actuated by the handle 15.

With the half nut disengaged, the dial 11 is rotated through its various cycles indicating different locations of the threads, by the engagement of the worm wheel 9 with the lead screw. The dial 11 may be calibrated to indicate various relative positions of the tool and the work. The handle 15 may be pushed down in order to register with a certain position of the thread. Our invention does not materially change methods of calibrating dials which have been in use for many years. There are a great variety of ways in which the dial may be calibrated.

In chasing work the half nut carries the intermediate carriage with the tool. The main drive of the intermediate carriage is disengaged during the chasing operation. The proper index is revealed on the dial during the first thread cutting operation and then by throwing in the chasing attachment at the proper interval, the same thread may be gone over.

The particular feature of novelty in the housing 7 is that the one housing may be disengaged from the position indicated in solid lines in Figure 2 and moved along the lead screw and bolted to the adjacent face of the unit 5 by merely reversing the studs. Thus in a very simple manner, the chasing attachment may be made to serve a double purpose.

In Figures 4 and 5, we have illustrated our novel quadrant for the change gears of the chasing attachment. It is necessary in a chasing attachment to have either a multiple of master screws or a single lead screw and an arrangement for varying the relation between the velocity of the lead screw and that of the work being threaded. In the drawings, Figures 4 and 5, we show a bracket 16 for supporting the lead screw 18. To this bracket is also clamped the quadrant 17, by means of stud 31 and nut 31a which binds the quadrant to the bracket passing through the slot 32. In this arrangement it will be observed that the gear 27 is rotated by the shaft 28 which is driven from the chuck. The gear 19 is attached to the lead screw. It will be observed there is no direct connection between the gear 27 and the gear 19. In order to connect these two gears, other gears known as change gears have been added. Gear 26 and gear 33 are held upon the quadrant by means of stud 25.

The stud 25 is fixedly held in the quadrant in a hole, the relation of which is previously determined. The gear 20 is also held upon a stud 22, fixedly located in a hole in the quadrant. Additional holes 23 and 24 are also located in the quadrant into which the stud 25 may be placed when making different combinations of the gearing. The holes 23, 24 and 25 bear fixed relations to the center of the lead screw shaft 18.

We claim no novelty in the fact that change gears are used to vary the speeds of the screw with relation to the work. It has previously been the practice to have a slot or series of slots in the quadrant so arranged that the studs which hold the change gears could be placed in these slots and the change gears held in place on the quadrant. It requires both patience and experience on the part of the workman to properly locate the gears. Further, as can readily be seen, instead of the studs having a substantial seat in the slot type of quadrant, they are supported only at the sides of the slotted portion, resulting in a weak and none too satisfactory construction. By using a fixed position for these studs, predetermined by the design of the unit, it is only necessary that the operator, when changing gears, place the stud in a proper hole with the gears as instructed by an instruction plate furnished as part of the chasing attachment. For instance, we show gear 19 meshed with gear 20 and gear 20 meshed with gear 26. There is no other place on this quadrant where the studs could be placed. Therefore, the combination is accurately located. Should a man desire to reverse the drive he would eliminate gear 20 and move gear 26 and stud 25 to the hole 23, in which case the gear 26 would be meshing with the gear 19.

Should it be desired that a man change and use a different gear in the place of gear 26, such a gear for illustration being the same size as gear shown as 33, he could place the gear and stud in hole 23 and by using gear 20 on stud 22 as shown in this illustration, mesh accurate the new gear with gear 22. Should he wish to reverse the drive and eliminate gear 20, he would place the new gear and stud in hole 24.

We have shown the usual function of the quadrant and described the changing of the gears from the various locations, and we will now describe the use of the slot 32. Gear 33 is often changed and by changing the gear 33, it is necessary that the entire quadrant pivot about the lead screw shaft 18. In so rotating the quadrant, no great skill is required to bring gears 33 and 27 into mesh, after which the quadrant is bound to the bracket 16 by means of stud 31 and nut 31a.

We do not wish to be limited to constructions in which the change gear quadrant is pivoted from the driven gear shaft, or, as in the illustration, to the lead screw shaft 18, since, as is well known, to men skilled in the art the quadrant may pivot from the driving shaft 28, in which case the holes 22, 23, 24 and 25 would bear a fixed relation to the shaft 28 instead of to the lead screw 18. Further, we do not wish to be limited to any definite number of fixed holes for locating the change gear studs.

In our construction, we have found that the four holes shown have provided a rather large range, which has been sufficient for all requirements which have been thus far encountered.

Having thus described our invention, what we claim as new and desire to secure by Letters Patent, is:—

1. A transferable lead screw engaging device for a turret lathe, having more than one tool carrying unit, comprising in combination a chasing and indicating mechanism, a housing and support for the entire lead screw engaging and indicating device, and means for securing said housing in operative position on either of said tool carrying units without removal of the apron from said tool carrying unit.

2. A transferable chasing attachment for a turret lathe, having an intermediate and a main carriage adapted to be driven by the same lead screw, comprising in combination with the chasing mechanism an indicating means for indicating relative positions of a carriage and the rotating chuck of the lathe, a housing for the entire lead screw engaging and indicating device, and means for securing said housing in a right hand position on one tool carrying unit, and in a left hand position on another.

3. A detachable lead screw engaging nut combined with an indicating device for a turret lathe having two tool carrying units, said lead screw engaging nut and indicating device having the same support means for mounting same in cooperative relaitonship with either of said tool carrying units.

THEODORE A. WETTIG.
CHARLES MEIER.